United States Patent [19]

Rudolph et al.

[11] 4,148,745

[45] Apr. 10, 1979

[54] METHOD OF PREPARING PHOSPHORIC ACID ESTERS FOR NON-POLLUTING STORAGE BY INCORPORATION IN POLYVINYL CHLORIDE

[75] Inventors: Günter Rudolph, Karlsruhe; Werner Hild, Leopoldshafen, both of Fed. Rep. of Germany

[73] Assignee: Gesellschaft für Kernforschung m.b.H., Fed. Rep. of Germany

[21] Appl. No.: 846,257

[22] Filed: Oct. 27, 1977

Related U.S. Application Data

[63] Continuation-in-part of Ser. No. 384,755, Jul. 31, 1973, abandoned.

[30] Foreign Application Priority Data

Jun. 16, 1973 [DE] Fed. Rep. of Germany ....... 2330845

[51] Int. Cl.$^2$ ............................ G21F 9/20; G21F 9/36
[52] U.S. Cl. ............................................. 252/301.1 W
[58] Field of Search .................................. 252/301.1 W

[56] References Cited

U.S. PATENT DOCUMENTS

| 3,298,960 | 1/1967 | Pitzer | 252/301.1 W |
|---|---|---|---|
| 3,463,738 | 8/1969 | Fitzgerald et al. | 252/301.1 W |
| 3,513,100 | 5/1970 | Stogner | 252/301.1 W |
| 3,557,013 | 1/1971 | Detilleux | 252/301.1 W |
| 3,644,604 | 2/1972 | Hooker | 252/301.1 W X |
| 3,679,595 | 7/1972 | Dollgast | 252/301.1 W |
| 4,009,116 | 2/1977 | Bahr et al. | 252/301.1 W |

FOREIGN PATENT DOCUMENTS

| 2135328 | 2/1973 | Fed. Rep. of Germany ... 252/301.1 W |
|---|---|---|
| 2330845 | 1/1975 | Fed. Rep. of Germany ... 252/301.1 W |
| 2356253 | 5/1975 | Fed. Rep. of Germany ... 252/301.1 W |

OTHER PUBLICATIONS

Fiztgerald, C. L. et al., "The Feasibility of Incorporating Radioactive Wastes in Asphalt or Polyethylene", in Nuc. App. Tech., 9:821-829, 12/1970.

Blanco, R. E. et al., "Radioactive Wastes ... Incorporating Industrial Wastes in Insoluable Media", in Chem. Eng. Prog., 66(2):51-56, 2/1970.

Burns, R. H., "Solidification of Low-and Intermediate-Level Wastes", in *Atomic Energy Rev.* 9(3):583-584, 9/1971.

*Primary Examiner*—Richard E. Schafer
*Attorney, Agent, or Firm*—Spencer & Kaye

[57] ABSTRACT

Admixtures of radioactive material contaminated phosphoric acid ester and polyvinyl chloride from essentially nonvolatile masses which do not flow.

18 Claims, No Drawings

METHOD OF PREPARING PHOSPHORIC ACID ESTERS FOR NON-POLLUTING STORAGE BY INCORPORATION IN POLYVINYL CHLORIDE

CROSS-REFERENCE TO RELATED APPLICATION

This application is a continuation-in-part of copending application Ser. No. 384,755 filed on July 31, 1973, and hereby incorporated by reference.

BACKGROUND OF THE INVENTION

In reprocessing spent nuclear fuels and/or blanket materials, phosphoric acid esters (mixed with hydrocarbons) are frequently used as solvent for extracting actinide elements. When such solvent is used for a prolonged period of time, radiolysis or chemical reactions give rise to undersized decomposition products. Although some of these products can be removed by cleaning steps, no complete separation is possible. Because of the pronounced complexing properties of decomposition products there is an increased, disturbing extraction of fission products, such as zirconium-95, from the aqueous phase into the organic phase loaded with actinides. However, an increase in fission product concentration of the organic phase not only reduces the extraction efficiency for the actinides and the separation efficiencies both of the actinides from the fission products and the actinides from each other and the degree of purity of the individual actinides but also enhances the radiolytic processes in the organic phase and, in addition, aggravates the phase separation by generating turbidities and colloids in the interface between the organic and aqueous phases.

For full utilization the solvent should be recycled. However, in that case a cumulation of unfavorable influences cannot be avoided, and the usefulness of a solvent batch is limited despite the decontamination step following every application. The rate at which a batch becomes unusable for further application is a function of such factors as the burnup level of the nuclear fuels and blanket materials, respectively, their concentration in the aqueous phase, the number of recycles of a batch (number of application steps), etc.

Solvent mixtures which have become useless in this way, or must be termed useless, represent strongly radioactively contaminated organic wastes and are separated first into their phosphoric acid ester and hydrocarbon constituents by means of the addition of phosphoric acid, the ester, e.g. tributyl phosphate (TBP), combining with phosphoric acid into an adduct insoluble in hydrocarbons, which adduct is further decomposed after separation from the hydrocarbons. The hydrocarbons can be removed by burning.

Various methods of TBP removal have so far been employed, but either they are unfeasible because of their environmental impact or they require relatively large expense in terms of time, facilities, cost, etc. It was suggested, for instance, to burn liquid organic wastes containing phosphoric acid esters. However, this generates highly corrosive gases carrying with them radioactive material and phosphorpentoxide aerosols. The usual type of filters for gases containing radioactive materials are plugged up within a very short time, corrode and thus become ineffective. The combustion or flue gases, therefore, must first be scrubbed and the phosphorpentoxide must be neutralized before there can be a final filtering step.

Moreover, it was suggested to discharge all solutions containing TBP into the ground in arid areas with a low population density. However, only some of the radioactive materials will be retained in the soil components, while most of them will pass through the layers of soil together with the organic liquid and may reach ground water.

Distillation processes can be used only for the more or less effective separation of TBP from hydrocarbons, but this neither removes the TBP nor prepares it in any way for non-polluting storage.

In addition, disadvantages connected with the methods outlined above give rise to some hazards, such as radioactive materials getting into the biocycle, organic liquids entering ground water, generation of easily flammable gases, and explosions in distillation plants.

Another technique which has been suggested in the prior art is the incorporation of TBP into polyethylene, as disclosed in U.S. Pat. No. 3,463,738 to Fitzgerald et al. Products produced by mixing polyethylene, with the addition of heat with either a mixture of tributyl phosphate and alkane hydrocarbon or with tributyl phosphate which had previously been separated from the alkane hydrocarbon, are solid gels which, during storage in containers for a period of time exhibit undesirable shrinkage as the result of a discharge of liquid. The solid polyethylene-containing bodies no longer contact the container walls. This shrinkage results in an environmental danger because the containers may break, for example, by mechanical force when the containers are stacked, or due to corrosion, and this breakage would enable the radioactive liquid to escape. Since the possibility of this discharge liquid entering the biocycle cannot be dependably excluded, the process for solidifying and removing radioactive organic waste liquids with the aid of polyethylene is unsuitable in view of the safety and environmental protection problems involved.

In an article by Burns, *Solidification of Low- and Intermediate-Level Wastes*, ATOMIC ENERGY REV., 9(3) pages 583 to 584, Sept., 1971, it is stated that limited experiments were carried out which show that it is possible to introduce chemical sludges, which contained about 50% water, into plastic wastes comprised of a mixture of polyethylene and polyvinyl chloride. In discussing the results obtained with the waste plastic mixture of polyethylene and polyvinyl chloride Burns states that the tests were experimental in nature, that the activity in wastes was kept to tracer levels, and that it would be advisable to carry out further experiments before coming to definite conclusions concerning the use of such waste plastic mixtures with aqueous chemical sludges. Burns does not disclose that such waste plastic mixtures can be used for solidification of organic phosphoric acid ester wastes.

SUMMARY OF THE INVENTION

The present invention provides a method which safely avoids the disadvantages and hazards connected with previous practices for the removal of spent phosphoric acid esters contaminated with radioactive materials. At the same time, phosphoric acid esters are brought into a state suitable for introduction into a secular store for radioactive wastes, i.e. they are not able to flow and they do not corrosively attack container material. Minimum leachability of the radioactive materials incorporated in this state is ensured by the present method in order to satisfy the environmental protection requirements. In addition, the overall cost of storing reprocessing plant waste is minimized. The products of the present invention do not exhibit shrinkage when placed in containers as a result of a discharge of liquid, and thus do not present any danger to the environment should the container in which it is placed break. The products formed by the method of the present invention closely contact the container walls of the container in which they are stored even after years of storage and do not discharge any liquids. These products are safe with respect to the environment which has to be protected and are suited for the permanent solidification of spent phosphoric acid ester organic waste liquids. The products can be in the form of a rubber-like mass which retains its volume and which assures permanent solidification.

The present invention thus relates to a method of preparing, for nonpulluting storage, phosphoric acid esters used in reprocessing spent nuclear fuels and/or blanket materials and to obtained products. In accordance with the present invention, phosphoric acid esters which have been separated from hydrocarbon and which contain radionuclides and decomposition products are contacted with a solidification matrix which consists of crushed polyvinyl chloride (PVC), in a weight ratio of phosphoric acid ester to PVC of 5 to 1 or less.

In a further aspect of the invention, a method is provided for preparing phosphoric acid ester used in reprocessing spent nuclear fuels and/or blanket materials for non-polluting storage, which phosphoric acid ester has been separated from hydrocarbon, which comprises contacting the separated phosphoric acid ester containing radionuclides and decomposition products with crushed polyvinyl chloride (PVC) to form a liquid mixture having a weight ratio of phosphoric acid ester to PVC of 5 to 1 or less, adding spent ion exchanger contaminated with radionuclides to the liquid mixture of phosphoric acid ester and PVC by stirring to form a resulting liquid mixture having a minimum PVC content of about 14 weight percent and then permitting the resulting liquid mixture to cool until a solid mass is formed which consists of the phosphoric acid ester, the PVC, and the spent ion exchanger.

The use of polyvinyl chloride as the sole solidification matrix component in accordance with the present invention, enables large quantities of the phosphoric acid ester to be absorbed. Thus, for example, the solid mass can contain equal quantities of phosphoric acid ester and polyvinyl chloride, and, in fact, can contain significantly greater quantities of phosphoric acid than polyvinyl chloride. Thus, the weight ratio of phosphoric acid ester to polyvinyl chloride can be, for example, 1:1, or can be even higher, such as 7:1.5. The upper limit for the ratio is 5:1 and this corresponds to a composition comprising about 83 weight percent phosphoric acid ester relative to about 17 weight percent PVC. The ratio, for example, can be from 1.47:1, which corresponds to a composition comprising about 59.5 weight percent phosphoric acid ester relative to about 40.5 weight percent PVC, to 3:1, which corresponds to a composition comprising about 75 weight percent phosphoric acid ester relative to about 25 weight percent PVC. Ratios of phosphoric acid ester to PVC of up to 3:1 are particularly suited for forming a rubber-like mass which retains its volume and which assures permanent solidification.

In the embodiment of the invention where spent ion exchange materials contaminated with radionuclides are added and form part of the final solid mass, the use of such ion exchange materials enables the amount of radioactive material in the solid mass to be increased up to 86%, comprised of the phosphoric acid ester and spent ion exchanger, and enables the amount of PVC used to be decreased down to 14%. In the present invention, spent ion exchange material is the only component which can be incorporated into mixtures of organic phosphoric acid esters and PVC. The ratio of organic phosphoric acid ester to PVC in this embodiment of the invention can be the same as those set forth above for the embodiment where PVC is the sole other component of the solidification product.

DESCRIPTION OF THE PREFERRED EMBODIMENTS

In one embodiment, phosphoric acid esters with tributyl phosphates as the dominating component are mixed with PVC chips at temperatures below the softening point of PVC, and the mixture is kept at room temperature until a solid, homogeneous mass is generated.

In another embodiment, phosphoric acid esters with TBP as the dominating component are homogeneously mixed with PVC chips at temperatures above the softening point of PVC; the heat added to attain these temperatures is allowed to act upon at least one of the noted ingredients of the mixture; and the mixture is left to cool so as to form a solid mass.

In order to minimize addition of inactive ingredients to the PVC mixture and thus prevent an increase in the resulting volume of radioactive waste (solidification products fit for secular storage), a preferred embodiment provides (a) for addition (with stirring) of spent ion exchanger (contaminated with radionuclides) to the liquid mixture of TBP and PVC in an amount in the order of 20 weight % referred to the weight of the sum of TBP, PVC and ion exchanger and (b) for letting the resulting mixture cool until a solid mass has been generated.

Although incorporation of radioactive material contaminated ion exchanger in a non-flowable (phosphoric acid ester)/PVC mass provides safe means for storing the radioactive material contained therein and incorporation in a similar mass of ion exchanger (whether spent or not) which has a capacity for absorbing the phosphoric acid ester provides means for reducing the proportion of PVC required to attain a non-flowable mass, a double advantage results when radioactive material contaminated spent ion exchanger having a capacity for absorbing the phosphoric acid ester is incorporated in such masses. Illustrative of ion exchangers which have the noted capacity even when they are spent and are contaminated with radioactive material are, e.g., polystyrene resins containing sulfonic acid groups or polystyrene resins containing trimethylammonium groups.

Regulations on the shipment of radioactive wastes to a place of secular storage and on secular storage proper require previous treatment of the wastes in a way which ensures that the environment is not contaminated even when waste containers are accidentally damaged. Hence, the requirements to be fulfilled, e.g., by TBP-PVC product masses as far as mechanical strength is concerned can be low and can be limited to the requirement that the product must not be able to flow. As a consequence, very favorable mixing ratios of TBP and PVC as a solidifying agent can be achieved in order to minimize any increase in volume of radioactive waste. Commercial grade relatively pure PVC can be used to generate products (containing only 20 weight % or less PVC) which are of a soft, jelly like consistency, but not able to flow. If PVC grades containing large amounts of plasticizer or filler are used, of course much less favorable mixing ratios must be condoned.

PVC softens at temperatures above 100° C., immediately forming homogeneous mixtures when stirred in the presence of TBP, which mixtures solidify on cooling. Because of the toxicity of TBP and its content of radioactive substance, however, heating requires precautionary measures and should be avoided. When TBP and crushed PVC are left as a mixture, the PVC absorbs the liquid TBP; when sufficient PVC is present, it swells so that no liquid is left after only 24 hours. Within a few weeks a compact mass forms which hardly differs from the corresponding product generated under the influence of heat. An alternative provides for heating TBP to a slightly elevated temperature, feeding it into crushed PVC in a container and producing a homogeneous solution by a short period of stirring.

One of the advantages of the present method is that bound TBP is not volatile during storage. A sample kept in open air for 16 months did not show any detectable loss of weight. Other waste products, such as spent radioactively contaminated ion exchangers, can also be included in the produced mixtures. Since some ion exchangers are capable of absorbing TBP, with ensuing swelling, smaller amounts of PVC (relative to TBP) will suffice to generate a product of sufficient strength in the presence of such ion exchangers. Another advantage of the present invention is that the PVC waste mixtures of the present invention do not shrink during solidification. The products produced in accordance with the present invention loosely contact the container walls even after years of storage and do not discharge any liquids.

In Examples 1 to 4 which follow, the employed TBP was produced through enrichment from genuine waste TBP which was not subjected to further drying; the PVC was a commercial grade product containing small amounts of a red filler. Similar results are obtained with any phosphoric acid esters used in reprocessing spent nuclear fuels and/or blanket materials. The results are also independent of the precise nature of radioactive materials involved. The Examples 1 to 4 are merely illustrative and not limitative.

EXAMPLE 1

Mixtures of 150 g of PVC chips each and various quantities of TBP are stirred and heated to 100 or 110° C. After cooling, jellylike products of different hardnesses are formed. They are characterized by means of data measured for the penetration coefficient according to DIN 1995. Different mixing ratios give rise to these penetration coefficients:
150 g of PVC chips and 320 g of TBP—penetration coefficient 179;
150 g of PVC chips and 400 g of TBP—penetration coefficient 232;
150 g of PVC chips and 450 g of TBP—penetration coefficient 330;
150 g of PVC chips and 600 g of TBP—penetration coefficient not measurable;
150 g of PVC chips and 700 g of TBP—flows as the vessel is tilted.

EXAMPLE 2

Mixtures of 75 g of PVC chips each and various quantities of TBP are left at room temperature and observed over prolonged periods of time. After some 24 hours the liquid is completely absorbed. When left for a longer time, a homogeneous, jellylike substance is generated which resembles the products generated under the influence of heat. The time up to complete homogenization is a function of the quantitative ratio between PVC and TBP and is approximately:
75 g of PVC chips and 75 g of TBP—4 weeks;
75 g of PVC chips and 110 g of TBP—5 weeks;
75 g of PVC chips and 160 g of TBP—6 weeks;
75 g of PVC chips and 200 g of TBP—8 weeks;
75 g of PVC chips and 300 g of TBP—10 weeks.

EXAMPLE 3

320 g of TBP are heated to 170° C. and poured into 150 g of PVC chips which are at room temperature. After a short period of stirring, a homogeneous mixture is generated. This mixture solidifies, forming a jellylike mass, on cooling.

EXAMPLE 4

150 g of PVC chips and 700 g of TBP are heated to 110° C., as in Example 1; 210 g of cation exchange resin, polysterene resin containing sulfuric acid groups, (previously dried in a drying closet) are stirred into the resulting liquid mixture.

After cooling, a soft mass in which the ion exchanger is embedded is obtained. This soft mass does not flow.

EXAMPLE 5

As a comparison, Example No. 1 of Fitzgerald et al., U.S. Pat. No. 3,463,738, was substantially reproduced as Test No. 1 as follows:

One hundred grams of a low molecular polyethylene were heated to 110° C. under a vacuum of about 1 mm mercury. 130 ml of a simulated organic waste solution comprising 30 volume percent tributylphosphate (TBP) and 70 volume percent dodecane were added to the heated polyethylene liquid during a period of 40 minutes. After mixing to form a substantially homogeneous texture, the temperature of the evaporator was increased to 130° C. and the mixture was heated further for 20 minutes to volatilize the dodecane, and during this time 90 ml of a liquid distillate were received. The pressure in the evaporator was then increased to atmospheric and the liquid residue was drained out into a beaker. Thereafter, the mass was left to cool to room temperature. The only difference between the process in this test and the process of the example No. 1 of Fitzgerald et al. U.S. Pat. No. 3,463,738, was the difference in reduced pressure in the evaporator. The effect of the lower pressure in the test process (1 mm Hg) is that the vaporization of the organic solvent is enhanced.

A relatively hard, nonflexible mass of a wax-like consistency which shrunk to an undesirable degree during cooling was formed.

In a second comparison test, the solidification process in Example No. 2 of Fitzgerald et al. was substantially reproduced, with the exception of using the same TBP-dodecane-solution as in Test No. 1 above, as follows:

One hundred grams of a low molecular polyethylene were heated to 110° C. 130 ml of a simulated organic waste solution comprising 30 volume percent tributylphosphate and 70 volume percent dodecane were added to the heated polyethylene liquid during a period of 40 minutes. After mixing to form a substantially homogenous texture, the temperature was then increased to 130° C. without producing a vacuum. After extraction, the mass was left to cool to room temperature.

A relatively hard, nonflexible mass of a wax-like consistency which shrunk to an undesirable degree during cooling was formed. The hardened mass from this test showed a formation of cracks.

It will be understood that the above description of the present invention is susceptible to various modifications, changes and adaptations and the same are intended to be comprehended within the meaning and range of equivalents of the appended claims.

What is claimed is:

1. A method for preparing phosphoric acid ester used in reprocessing spent nuclear fuels and/or blanket materials for non-polluting storage, which phosphoric acid ester has been separated from hydrocarbons, which comprises contacting the separated phosphoric acid ester containing radionuclides and decomposition products with a solidification matrix which consists of crushed polyvinyl chloride (PVC), in a weight ratio of phosphoric acid ester to PVC of 5 to 1 or less.

2. The method according to claim 1 which comprises mixing tributyl phosphate dominant phosphoric acid ester with PVC chips at a temperature below the softening point of PVC and maintaining the resulting admixture at room temperature to form a solid, homogeneous mass.

3. The method according to claim 1 which comprises homogeneously mixing tributyl phosphate dominant phosphoric acid ester with PVC chips at a temperature above the PVC softening point and permitting the resulting admixture to cool and form a solid mass.

4. The method according to claim 1 wherein the weight ratio of phosphoric acid ester to polyvinyl chloride is at least 1:1.

5. The method according to claim 1 wherein the weight ratio of phosphoric acid ester to polyvinyl chloride is in the range of from 7:1.5 to 1:1.

6. The method according to claim 1 wherein the weight ratio of phosphoric acid ester to polyvinyl chloride is at least 1.47:1.

7. The method according to claim 1 wherein the weight ratio of phosphoric acid ester to polyvinyl chloride is at least 2.13:1.

8. The method according to claim 1 wherein the weight ratio of phosphoric acid ester to polyvinyl chloride is at least 2.67:1.

9. The method according to claim 1 wherein the weight ratio of phosphoric acid ester to polyvinyl chloride is at least 3.00:1.

10. The method according to claim 1 wherein the weight ratio of phosphoric acid ester to polyvinyl chloride is at least 4.00:1.

11. The method according to claim 1 wherein the weight ratio of phosphoric acid ester to polyvinyl chloride is at least 4.67:1.

12. The method according to claim 1 wherein the weight ratio of phosphoric acid ester to polyvinyl chloride is from 1.47:1 to 3:1.

13. A method for preparing phosphoric acid ester used in reprocessing spent nuclear fuels and/or blanket materials for non-polluting storage, which phosphoric acid esters have been separated from hydrocarbons, which comprises contacting the separated phosphoric acid ester containing radionuclides and decomposition products with crushed polyvinyl chloride (PVC) to form a liquid mixture having a weight ratio of phosphoric acid ester to PVC of 5 to 1 or less, adding spent ion exchanger contaminated with radio nuclides to the liquid mixture of phosphoric acid ester and PVC by stirring to form a resulting liquid having a minimum PVC content of about 14 weight percent and then permitting the resulting liquid mixture to cool until a solid mass is formed which consists of the phosphoric acid ester, the PVC, and the spent ion exchanger.

14. The method according to claim 13 wherein the spent ion exchanger is added in an amount of 20 weight percent, based on the total weight of the resulting liquid mixture.

15. An essentially nonvolatile mass which does not flow at room temperature and consists of an admixture of
    (a) at least one phosphoric acid ester contaminated with radioactive material and which has been separated from hydrocarbon and
    (b) polyvinyl chloride, in the weight ratio of phosphoric acid ester to polyvinyl chloride being at most 5 to 1.

16. A mass according to claim 15 wherein the phosphoric acid ester comprises tributyl phosphate.

17. An essentially nonvolatile mass which does not flow at room temperature and consists of an admixture of
    (a) at least one phosphoric acid ester contaminated with radioactive material and which has been separated from hydrocarbon,
    (b) polyvinyl chloride, and
    (c) radioactively contaminated spent ion exchanger, the weight ratio of phosphoric acid ester to polyvinyl chloride is at most 5 to 1, and in the mass contains at least about 14 weight percent of polyvinyl chloride.

18. A mass according to claim 17 wherein the phosphoric acid ester comprises tributyl phosphate.

* * * * *